United States Patent [19]
McDaniel

[11] Patent Number: 5,206,996
[45] Date of Patent: May 4, 1993

[54] TUBING CUTTERS

[76] Inventor: William A. McDaniel, 1915 Loyd Cir., Pearl, Miss. 39208

[21] Appl. No.: 861,570

[22] Filed: Apr. 1, 1992

[51] Int. Cl.[5] ........................ B26D 3/16; B26B 27/00
[52] U.S. Cl. ........................................ 30/101; 30/91.1
[58] Field of Search ............... 30/91.1, 91.2, 92, 95, 30/99, 101, 102; 7/125; 81/486

[56] References Cited

U.S. PATENT DOCUMENTS

| | | | |
|---|---|---|---|
| 86,322 | 1/1869 | Rowe . | |
| 649,334 | 5/1900 | Meloos | 7/125 |
| 2,502,245 | 3/1950 | Charles | 30/91.1 |
| 3,216,110 | 11/1965 | Stallings | 30/91.2 |
| 3,335,492 | 8/1967 | Spiro | 30/101 |
| 3,651,569 | 3/1972 | Arnot | 30/95 |
| 3,714,712 | 2/1973 | Hoffman | 30/95 |
| 3,796,115 | 3/1974 | Dane | 30/91.2 |
| 4,763,413 | 8/1988 | Rothenberger | 30/94 |
| 4,769,911 | 9/1988 | Araki | 30/95 |
| 5,007,313 | 4/1991 | Jeromson, Jr. et al. | 81/486 |
| 5,065,650 | 11/1991 | Anderson et al. | 81/486 |
| 5,099,577 | 3/1992 | Hutt | 30/101 |

FOREIGN PATENT DOCUMENTS 1408703 10/1975 United Kingdom ................. 30/91.1

Primary Examiner—Frank T. Yost
Assistant Examiner—Paul M. Heyrana, Sr.
Attorney, Agent, or Firm—Richard C. Litman

[57] ABSTRACT

A tool for cutting tubing or light pipe provides conventional cutting rollers and a blade in combination with a spring loaded, open jaw clamp. The open jaw permits the tool to be passed over the side of the material to be cut, while the spring compressive force automatically urges the cutting blade into the material being cut as the tool is rotated around the material in the manner of conventional tubing and pipe cutters. Thus, the need to continually adjust the cutting blade as the cut deepens is eliminated. Two basic embodiments are disclosed, one comprising a handled clamp type tool with or without foldable or extendible handles, and the other comprising a C clamp type tool. The spring loading arrangement of the cutting blade is common to both. Various versions and improvements are also disclosed, including mechanisms providing for parallel actuation of the cutting assembly, proper spacing of the cutting rollers, and maintaining the proper angular relationship between the rollers and the cutting blade.

9 Claims, 4 Drawing Sheets

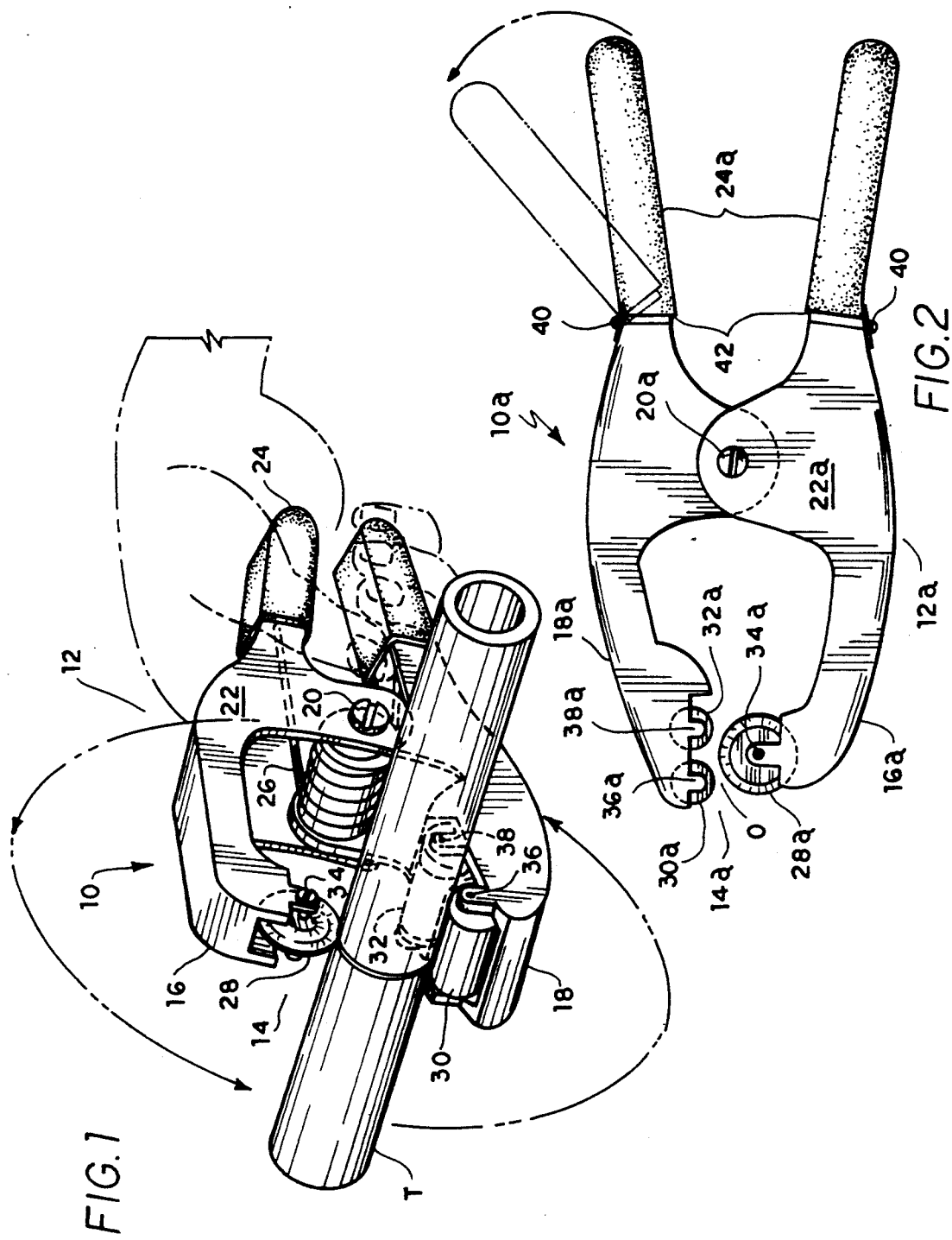

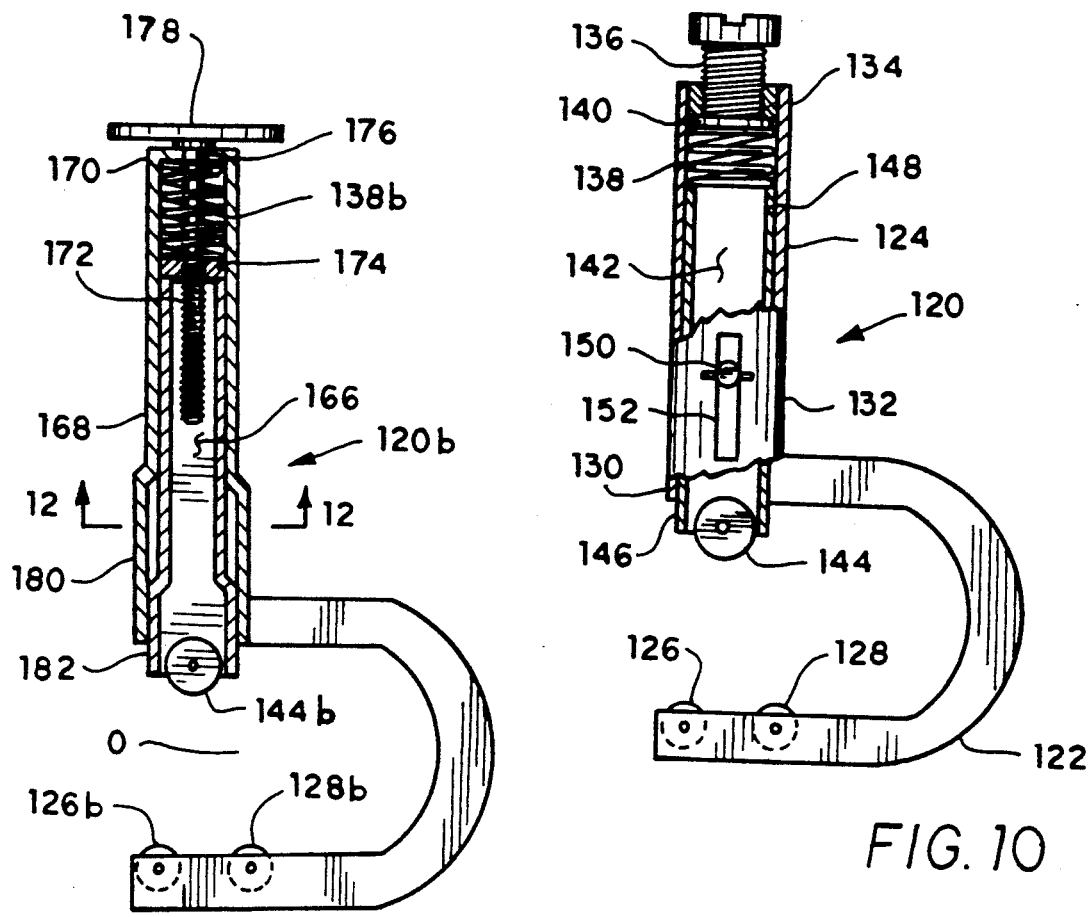
FIG. 11
FIG. 10
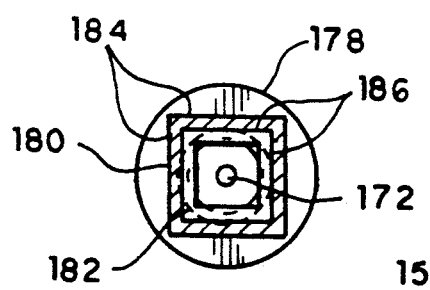
FIG. 12
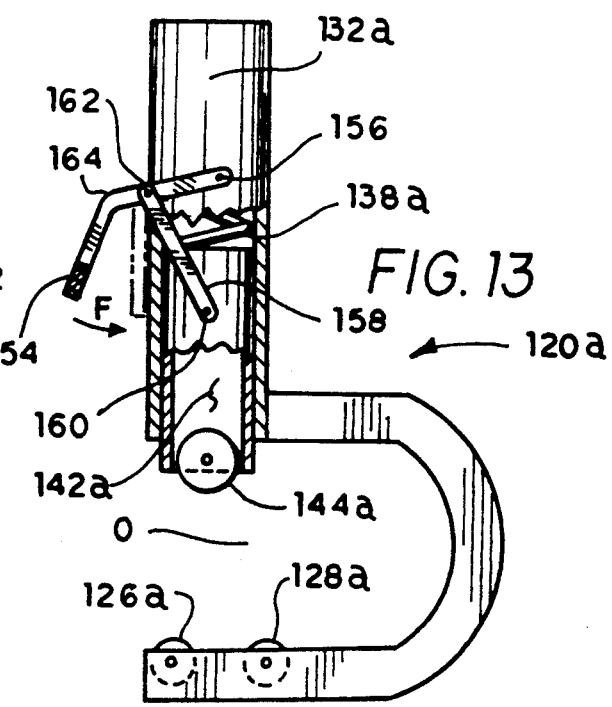
FIG. 13

TUBING CUTTERS

FIELD OF THE INVENTION

This invention relates generally to hand operated tubing cutter type tools, and more specifically to various embodiments of such tools which employ spring loading to produce a biasing force on the cutting blade, as well as other improvements.

BACKGROUND OF THE INVENTION

Hand operated tools for cutting tubing, light pipe, and other hollow cylindrical materials are well known. Such devices generally include at least one cutting blade or wheel disposed opposite at least two rollers, thus providing triangulation and positive location around the circumference of the material being cut. The cutting device is rotated about the circumference of the material being cut, in order to move the cutting blade completely around the material.

One feature universal to all such cutting devices is a means to advance the cutting blade into the material being cut as the operation is performed, due to the ever increasing depth of the cut as the operation progresses. As can be seen, if the cutting blade is not advanced, an initial shallow cut would be made about the circumference of the material and no further cutting action would take place. The general method for advancing the cutting blade in such implements is by means of a threaded screw advance of the rotary cutting blade. The positive advancement thereby provided is extremely effective, but generally requires manual advancement of the cutting blade by means of the screw adjustment every one or two turns of the cutter around the material. This is obviously a tedious procedure if the material being cut has a relatively thick wall. Moreover, great care must be used in advancing the cutting blade, as the blade edge may be dulled or damaged, or the axis of the rotary cutting blade may be displaced, if the screw advance is tightened too much. On the other hand, too little force on the cutting blade advance results in a relatively slow and inefficient cutting operation.

Additional features are desirable in such cutters to further enhance the cutting operation, such as the incorporation of means allowing some circumferential movement of the cutting blade to better balance the forces on the blade and rollers. Due to the geometry of at least one embodiment of the present invention, such circumferential movement of the cutting blade may be desirable in order to properly triangulate the cutting blade and support rollers. Such a feature should also provide further fine adjustment in the spring force biasing the cutting blade or wheel toward the rollers in order to optimize the cutting rate and pressures.

The need arises fur a cutting tool for tubing or the like, which tool is capable of automatically providing constant pressure to the material being cut by the cutting blade or wheel, thereby obviating any requirement for manual adjustment of the tool during the cutting operation. Further, means are needed to allow the cutting blade or wheel to "float" to a certain extent, thereby allowing the cutting blade to adjust to the optimum geometry depending upon the diameter of the material being cut, and further to allow fine adjustment of cutting pressure.

DESCRIPTION OF THE RELATED ART

U.S. Pat. No. 86,322 issued to P. C. Rowe on Jan. 26, 1969 discloses a Wrench, which tool is convertible to a tubing or pipe cutter. A spring is included which biases the jaws to an open position, rather than closed as in the present invention. The force required for a cutting operation is supplied by manual pressure from the operator, rather than by spring pressure as in the present invention.

U.S. Pat. No. 3,651,569 issued to A. E. R. Arnot on Mar. 28, 1972 discloses a Device For Working A Cylindrical Work-Piece. The device includes a gear train providing for the advance of the cutting blade or wheel, rather than spring pressure as in the present invention. Various embodiments are disclosed using generally the same mechanical principle of operation.

U.S. Pat. No. 3,714,712 issued to J. W. Hoffman on Feb. 6, 1973 discloses a Cutting Or Grooving Tool. While spring pressure is used to urge the cutting blade against the material to be cut, the device completely encircles the pipe in order to provide the necessary strength to cut or groove heavy pipe. Thus, the device may only be installed or removed from one end of the pipe, rather than slipped over from one side as in the case of the present invention.

Finally, U.S. Pat. No. 4,763,413 issued to G. Rothenberger on Aug. 16, 1988 discloses a Chain Tube Cutter. The device is closely related to a chain-type pipe wrench, but includes a plurality of cutting blades or wheels disposed about the connecting pin axes of the chain.

None of the above noted patents, either singly or in combination, are seen to disclose the specific arrangement of concepts disclosed by the present invention.

SUMMARY OF THE INVENTION

By the present invention, an improved tool for the cutting to length of tubing, light pipe and the like is disclosed.

Accordingly, one of the objects of the present invention is to provide an improved tubing cutter which requires no further adjustment during the cutting operation.

Another of the objects of the present invention is to provide an improved tubing cutter which is capable of providing essentially constant cutting force by means of one or more springs biasing the cutting blade toward the stock to be cut and the opposed rollers of the tool.

Yet another of the objects of the present invention is to provide an improved tubing cutter which includes means for the adjustment of the spring compressive force.

Still another of the objects of the present invention is to provide an improved tubing cutter which may be installed from the side of the material to be cut, rather than requiring installation from one end.

A further object of the present invention is to provide an improved tubing cutter which provides extendible handles for greater leverage during the installation, but which handles may be folded to allow use in a restricted space once installed upon the material to be cut.

An additional object of the present invention is to provide an improved tubing cutter which, in at least one embodiment, includes means compensating for the angular change between rollers and cutting blade for different diameters of material.

Another object of the present invention is to provide an improved tubing cutter which provides many of the above advantages relating to spring biasing force and adjustability of spring force, in a further embodiment which provides a constant linear relationship between the cutting blade and rollers.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a perspective view of one embodiment of the present invention in use.

FIG. 2 is an inverted side view of the embodiment of FIG. 1, showing an additional feature.

FIG. 10 is a side view partially in section of a further embodiment of the present invention.

FIG. 11 is a side view partially in section of an alternative mechanism similar to that shown in FIG. 10.

FIG. 12 is a top view in section through line 12—12 of FIG. 11, of the adjustment mechanism of FIG. 11.

FIG. 13 is a side view partially in section of a means of lifting the cutting wheel against the spring compression.

Similar reference characters designate corresponding parts throughout the several figures of the drawings.

DESCRIPTION OF THE PREFERRED EMBODIMENTS

Figure 3:
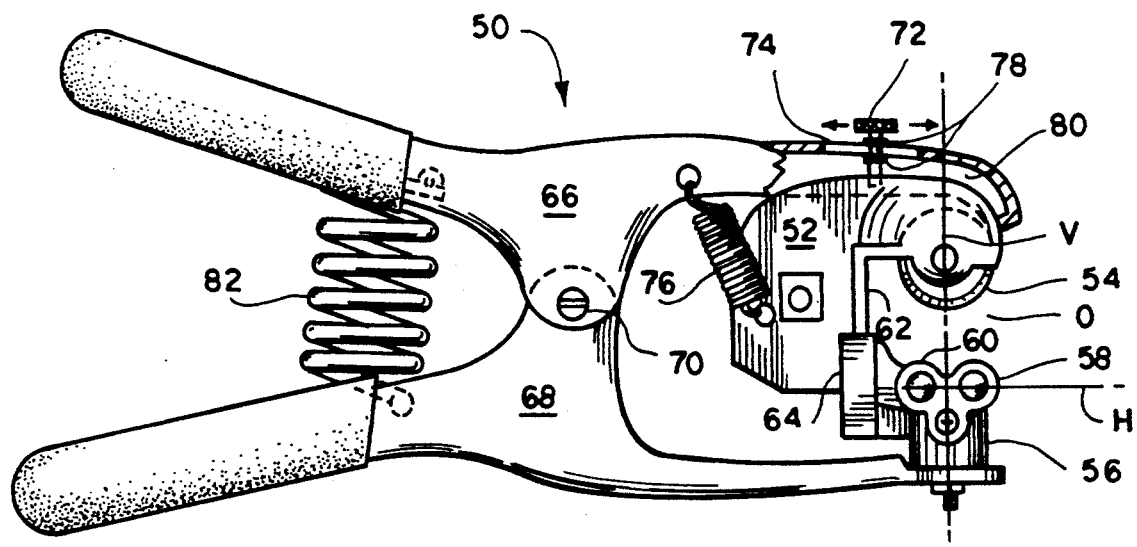
FIG. 3 is a side view, partially in section, of an alternate embodiment providing for alignment of the cutting blade and rollers.

Referring now to the drawings, particularly FIG. 1 of the drawings, the present invention will be seen to relate to a tool 10 useful in the circumferential cutting of tubing T and light pipe of various diameters. Tool 10 basically comprises a clamp portion 12 having a cutting portion 14 contained within the first and second jaws 16 and 18. First and second jaws 16 and 18 are pivotally secured together by pivot 20, essentially in the center area 22 of clamp portion 12, and handles 24 extend outward opposite first and second jaws 16 and 18 to complete the basic structure of clamp portion 12. A torsional spring 16 contained within the center area 22 about pivot 20 provides a compressive force to first and second jaws 16 and 18, urging them together.

First jaw 16 contains a cutting blade or wheel 28, while second jaw 18 includes a forward roller 30 and a rearward roller 32. Cutting blade 28 is free to rotate about blade axle 34, while forward and rear rollers 30 and 32 respectively rotate about forward roller axle 36 and rear roller axle 38.

FIG. 2 discloses an essentially similar tool 10a, having corresponding components 12a through 38a. However, the handles 24 of tool 10 will be seen to extend outward some distance from cutting portion 14, thus possibly precluding the use of tool 10 on a section of tubing T while is located in a closely confined area, e.g. immediately adjacent a wall or ceiling. The tool 10a of FIG. 2 provides some relief from this potential problem, by means of hinges 40 serving to secure the inboard end 42 of handles 24a to the center portion 22a of tool 10a. Hinges 40 are located upon the surface of tool 10a opposite pivot 20a, thus allowing handles 24a to be folded away from one another and adjacent the center portion 22a of tool 10. When thus folded, tool 10a forms a more compact unit capable of operating much closer to adjacent structures or obstacles. When handles 24a are extended, the inboard end portion 42 of each handle 24a opposite hinge 40 abuts the adjacent center portion 22a of tool 10, thus precluding handles 24a from folding opposite the intended direction and providing a solid grip for the opening of jaws 16a and 18a by means of handles 24a.

FIG. 2 also provides a clearer view of the opening O separating jaws 16a and 18a, and thus rollers 36a and 38a and cutting blade 28a comprising cutting portion 14a. Opening O permits tool 10a to be passed over the side of the tubing or other material T to be cut, as shown in FIG. 1, rather than requiring that tool 10a be passed over one end of the tube T. Opening O will be seen to be common to all of the cutting tools of the present invention, and is not limited to the embodiment shown in FIG. 2.

Figure 7:
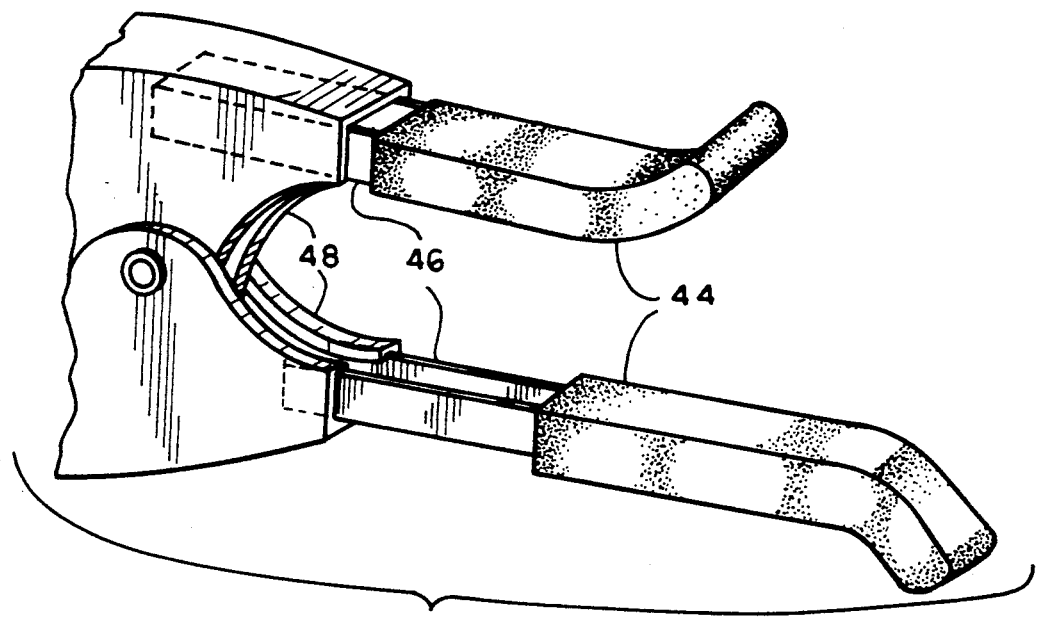
FIG. 7 is a perspective view showing extendible handles.

FIG. 7 provides for an alternate arrangement of telescoping handles for a tool according to the present invention. Handles 44 are each provided with a channel portion 46 which is telescopingly insertable within a cooperating channel portion 48. The purpose for the provision of such telescoping handles 44 is not so much to provide for use in a compact space, as in the case of hinged handles 24a, but rather to provide greater leverage when handles 44 are compressed together to spread the jaws of the tool. The longer arm provided by the extension of handles 44 and handle channels 46 from cooperating channels 48, provides such additional leverage as may be needed in the case of a relatively strong spring. Obviously, the retraction of handle channels 46 within cooperating channels 48, will also serve to some extent to provide a more compact tool for use in tight spaces. Nevertheless, the primary reason for the arrangement provided in FIG. 7 is to provide greater leverage in the operation of the tool.

FIG. 3 discloses an alternate embodiment of tool 10 or 10a, generally designated as 50. In order to provide for use of a tubing cutter with a relatively wide range of tubing or pipe diameters, it is generally desirable to include means to assure that the cutting blade and rollers maintain essentially the same angular relationship with one another. That is, each roller should maintain the same distance from the cutting blade as the other roller. Otherwise, as such a cutter is rotated about the material being cut, the tubing or pipe may have a tendency to roll out of the cutting jaws toward the roller providing the greatest open distance from the cutting blade. This arrangement is shown by means of the generally horizontal axis H, which passes through the center of rotation of the two rollers 58 and 60, and the generally vertical axis V, which passes through the center of the cutting blade 54 and thence downward to bisect the line between the two rollers 50 and 60. Axes H and V are preferably mutually perpendicular, in order to provide the equidistant positioning of each roller 58 and 60 from cutting blade 54. While this geometric relationship is not absolutely required, it is desirable for optimum efficiency. While the tools 10 and 10a of FIGS. 1 and 2 are capable of operating quite satisfactorily on material of a relatively narrow range of diameters, it will be seen that the angular relationship provided by first and second jaws 16 and 18 or 16a and 18a may lead to the potential problem discussed immediately above.

Most tubing and pipe cutters solve this potential problem by the means included in tool 50 of FIG. 3. Tool 50 contains a cutting jaw 52 having a cutting blade or wheel 54, and a roller jaw 56 having a forward roller 58 and a rear roller 60. Cutting jaw 52 has a first track 62 and opposite second track (not shown), which tracks cooperate respectively with a first channel 64 and second channel (not shown) of roller jaw 56. Track 62 and channel 64, along with their respective opposite members, provide for the precise alignment of cutting blade 54 relative to rollers 58 and 60 at all times regardless of the distance therebetween and the diameter of the material being cut.

However, the inclusion of such a mechanism as components 52 through 64 of FIG. 3 will be seen to require some form of non-rigid attachment to the remainder of tool 50 due to the angular action of the first and second clamp portions 66 and 68 about pivot 70, as opposed to the linear action of cutting jaw 52 relative to roller jaw 56. The embodiment of FIG. 3 provides for this by the attachment means shown and described immediately below. Typically, tubing and light pipe cutters include a threaded mechanism connecting the two jaws together, and providing for positively closing the distance between the cutting blade and the rollers as the material is being cut. The embodiment of FIG. 3 may make use of such a mechanism to secure cutting jaw 52 within first clamp portion 66, by means of attachment screw 72. Attachment screw 72 extends through a slot 74 in first clamp portion 66, and is threaded into cutting jaw 52. The slot 74 provides sufficient angular freedom for cutting jaw 52 relative to first clamp portion 66, and further allows cutting jaw to maintain the required rigid linear relationship with roller jaw 66 according to the track and channel means described above. Thus, as first clamp portion 66 is opened, thereby moving angularly upward and rearward relative to roller jaw 56, attachment screw 72 and slot 74 permits such movement of cutting jaw 52 relative to first clamp portion 66 as necessary to maintain the alignment with roller jaw 56 as required by the track and channel arrangement therebetween.

In order to provide positive retention of cutting jaw 52 relative to first clamp portion 66, a retaining spring 76 is used to bias cutting jaw 52 toward first clamp portion 66. Retaining spring 76 in combination with attachment screw 72 also serve to provide a fine adjustment of the distance, and therefore the cutting force, between cutting jaw 52 and roller jaw 56. Retaining collars 78 on attachment screws 72 serve to hold screw 72 at the same depth within slot 74, but allow screw 72 to be threaded into or out from cutting jaw 52 to adjust the distance 80 between cutting jaw 52 and first clamp portion 66. While coil spring 82 (alternatively, the torsional spring 26 of the embodiment of FIG. 1 could be used) provides the required compressive force between cutting jaw 52 and roller jaw 56, and above described retaining spring and screw means provide for additional adjustment of the distance, and therefore force, therebetween.

Figure 4:
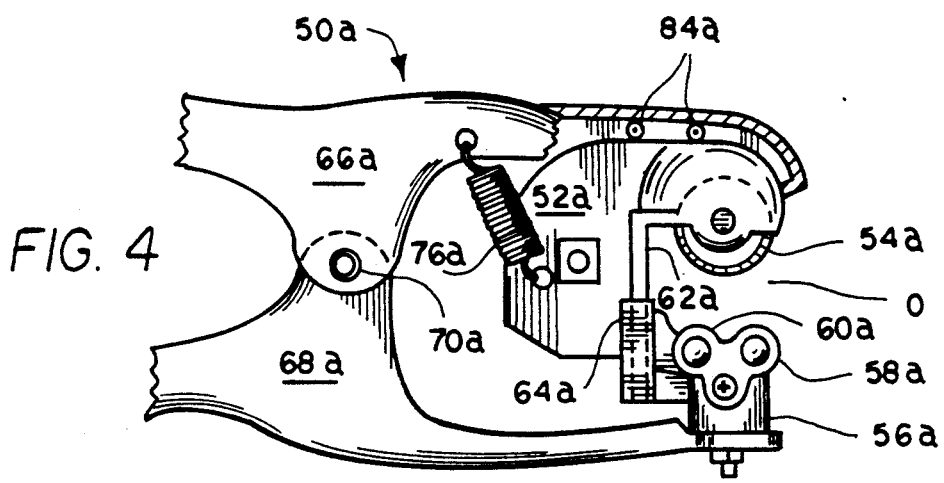
FIG. 4 is a side view showing a means of allowing for movement between two of the components.
Figure 5:
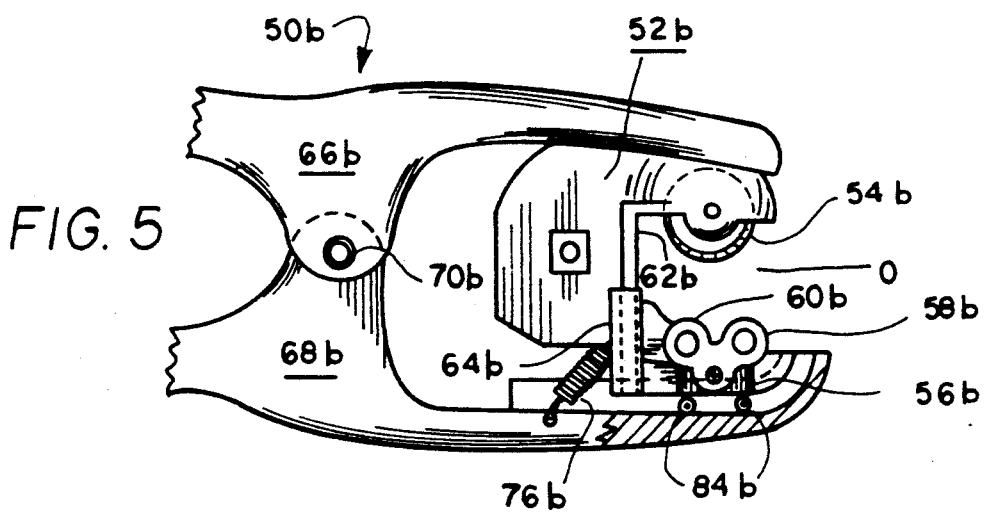
FIG. 5 is a side view of an alternate means of allowing movement.

FIGS. 4 and 5 disclose alternative means permitting movement of jaws 52a or 56b respectively, relative to a first clamp portion 66a or second clamp portion 68b. In order to allow the same relative motion between components as described above, roller bearings 84a or 84b are provided respectively between first clamp portion 66a and cutting jaw 52a of FIG. 4, or alternatively between second clamp portion 68b and roller jaw 56b of FIG. 5. The roller bearings 84a of FIG. 4 will be seen to permit the required relative movement between first clamp portion 66a and cutting jaw 52a, while still allowing the linear alignment between cutting jaw 52a and roller jaw 56a required by track 62a and channel 64a. The arrangement of FIG. 5 is similar, but places bearings 84b between roller jaw 56b and second clamp portion 68b. Cutting jaw 52b is rigidly affixed to first clamp portion 66b in the embodiment of FIG. 5. In either case, roller bearings 84a or 84b permit the necessary movement between components, while still allowing the required linear relationship between cutting and roller jaws 52a or b and 56a or b. A retaining spring 76a or 76b may be provided to respectively bias cutting jaw 52a toward first clamp portion 66a as shown in FIG. 4, or roller jaw 56b toward second clamp portion 68b as shown in FIG. 5. Obviously, an attachment screw (not shown in FIGS. 4 or 5) may be added as shown in FIG. 3 (component 72), to provide fine adjustment of the respective distances and forces between cutting jaws 52a or b and roller jaws 56a or b of FIGS. 4 and 5.

It will be seen that while roller bearings 84a or 84b allow the required movement between jaw components and clamp components, that there will also be some relative angular movement as first and second clamp portions 66a or b and 68a or b are spread. This is of no consequence in the embodiments of FIGS. 4 and 5, as the most rearward roller bearing 84a or b will provide the necessary support and freedom of movement for the appropriate jaw while the forwardmost roller bearing remains clear of the respective jaw. Tools 50a or 50b will still function as required as the angular relationship between components changes as first and second clamp portions 66a or b and 68a or b are opened.

Figure 6:
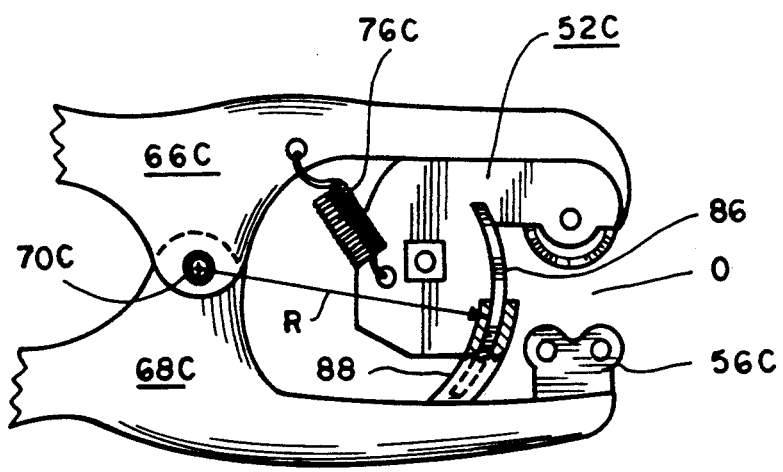
FIG. 6 is a side view of a modified cutting assembly.

A problem noted above is the linear motion of the roller jaw 56 relative to the cutting jaw 52, in combination with the angular action of the first and second clamp portions 66 and 68 due to their pivotal movement about pivot 70. The modification shown in FIG. 6 provides an arcuate track 86 for cutting jaw 52c, and a cooperating arcuate channel 88 for roller jaw 56c. Arcuate track 86 and arcuate channel 88 are provided with a radius R equal to their distance from pivot 70c. Thus, no means providing for relative motion between first clamp portion 66c and cutting jaw 52c, or between second clamp portions 68c and roller jaw 56c, need be included when arcuate track and channel means 86 and 88 are provided in combination with the other elements of the present invention. The pivotal axis provided by pivot 70c and arcuate track and channel 86 and 88 assure that all movement of components relative to one another will be of the same form and in the same plane.

Figures 8A, 8B, 9:
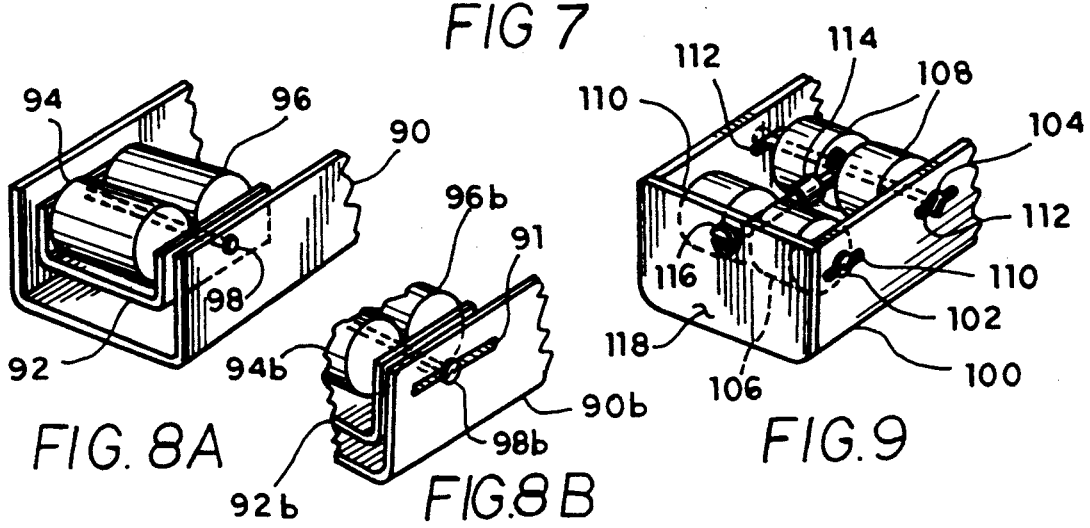
FIG. 8A is a perspective view of the rollers for the cutting tool, providing a means to allow for angular variation.
FIG. 8B is a partially broken perspective view, showing a means allowing for angular and longitudinal variation.
FIG. 9 is a perspective view of a means providing for the spatial adjustment of the rollers.

In the event that no cooperating means is provided (other than the cooperating first and second clamp portions) to guide the cutter and roller portions, it will be necessary to provide another means of allowing arcuate motion of the roller portion relative to the remainder of the tool. One such means is shown in FIG. 8A of the drawings. FIG. 8A represents a portion of a jaw 90, similar to second jaw 18 of FIG. 1, which has been modified to provide a channel shape. Jaw channel 90 includes a smaller roller channel 92 installed therein, which roller channel 92 contains a forward roller 94 and rear roller 96. Rollers 94 and 96 have transverse axes extending between the sides of roller channel 92 in order to allow them to rotate in use. In order to provide the alignment of rollers 94 and 96 relative to an opposed cutting blade or wheel, a pivotal roller channel axis 98 extends between the side walls of jaw channel 90, thereby allowing roller channel 92 to rotate thereupon to the limits provided by surrounding jaw channel 90. Thus, forward and rear rollers 94 and 96 are also free to arcuately rotate as required in order to maintain the proper geometric relationship with an opposed cutting blade (as shown in FIG. 3) when such an operation is performed.

FIG. 8B provides for an additional improvement over the structure shown in FIG. 8A, in that the jaw channel 90b includes a channel axis slot 91 on each side. Roller channel axis 98b extends through channel axis slot 91 and is free to move forward and rearward within each slot 91, thus allowing roller channel 92b and rollers 94b and 96b to travel forward or rearward relative to jaw channel 90b. This additional freedom of movement provides further adjustment for rollers 94b and 96b over the purely pivotal adjustment provided for rollers 94 and 96 as shown in FIG. 8A.

In order to provide the maximum use of the tool, it is desirable to allow the cutting of as wide a range of diameters of material as possible. Obviously, relatively small diameter tubing may tend to jam or slip between the rollers if the rollers are too widely spaced. On the other hand, large diameter tubing or pipe may slip out of the grip of the rollers as the tool is turned, if the rollers are located too close together. Thus, some means for the adjustment of the space between the rollers is highly desirable.

One such means of accomplishing this is shown in FIG. 9. A slotted jaw channel 100 is provided for the forward and rear axes 102 and 104 respectively of forward and rear rollers 106 and 108. A forward slot 110 and rear slot 112 is provided in each side of slotted channel 100 in order to allow forward and rearward movement of axes 102 and 104, and thus forward and rear rollers 106 and 108.

In order to secure rollers 106 and 108 at the desired spacing, an alternately threaded rod or turnbuckle 114 is threaded through the center of each of the axes 102 and 104. The portion of rod 114 passing through the center of forward axis 102 may be provided with right hand threads, while the portion of rod 114 passing throughout the center of rear axis 104 may be provided with left hand threads, for example. Thus, the rotation of rod 114 by means of head 116 captured within front plate 118, will cause forward and rear axes 102 and 104, and therefore forward and rear rollers 106 and 108, to advance in opposite directions to one another. For the threaded arrangement described above, for example, the clockwise rotation of rod 114 by means of head 116 will result in forward axis 102, and therefore forward rollers 106, advancing toward front plate 118, while the left hand threaded portion of rod 114 passing through rear axis 104 will cause that axis 104 to retreat away from forward plate 118, thus widening the space between forward and rear rollers 106 and 108 to provide adequate support for relatively large diameter tubing or pipe. The reverse action results in a narrowing of the gap between the two roller sets 106 and 108, as desired for smaller diameter tubing.

A further embodiment is disclosed in FIGS. 10 through 13. While the basic concept of an open jawed tubing or pipe cutter having a cutting blade or wheel biased by spring pressure is identical in each of the embodiments, the embodiment shown in FIGS. 10 to 13 provides an alternate means of forming the tool. Tool 120 of FIG. 10 includes two basic components: A generally C-shaped roller carriage 122, and cutting blade housing 124. Roller carriage 122 incorporates a forward and a rear roller, respectively numbered 126 and 128, and is secured to the lower end 130 of outer cylinder 132 of cutting blade housing 124. Obviously, the forward and rear rollers 126 and 128 may incorporate the various adjustment means disclosed in FIGS. 8A through 9 if desired. The upper end 134 of outer cylinder 132 is closed by a threaded fitting 136, which fitting 136 may be threaded into or out of the upper end 134 of outer cylinder 132 in order to provide fine adjustment for the compression provided by spring 138 therein. A bearing pad 140 may be installed between fitting 136 and spring 138 if desired.

An inner cylinder 142 is contained within outer cylinder 132 and includes a cutting blade 144 at its lower end 146. As the upper end of spring 138 is captured by the upper end 134 of outer cylinder 132 and threaded fitting 136, spring 138 will be seen to exert a downward force upon the upper end 148 of inner cylinder 142, thereby urging inner cylinder 142 and cutting blade 144 downward toward rollers 126 and 128, and serving to apply cutting pressure to any cylindrical material therebetween, In order to prevent inner cylinder 142 from being pushed outward from the lower end 130 of outer cylinder 132, a pin 150 is installed laterally through opposite slots 152 located in the walls of outer cylinder 132, the pin 150 passing through the sides of inner cylinder 142. Slots 150 (one of which is visible in the partially broken away side view of FIG. 10) will be seen to provide the required vertical travel of pin 150 and inner cylinder 142 relative to outer cylinder 132, thus allowing cutting blade 144 to be drawn away from rollers 126 and 128 to allow cylindrical material such as tubing T to be inserted therebetween. Pin 150 may extend outward from the sides of outer cylinder 132, in order to permit the user of tool 120 to grasp pin 150 in order to draw inner cylinder 142 upward. Slots 152 and pin 150 will be seen to further prevent axial rotation of inner cylinder 142 relative to outer cylinder 132, thus maintaining the alignment of cutting blade 144 relative to rollers 126 and 128.

It is possible that the spring 138 of FIG. 10 may develop sufficient compressive force to make it difficult for the user of tool 120 to draw the inner cylinder 142 upward relative to outer cylinder 132, particularly in the case of relatively large diameter material. Tool 120a of FIG. 13 discloses an alternate means of drawing inner cylinder 142a upward against the compressive force of spring 138a in order to widen the opening O between cutting blade 144a and rollers 126a and 128a. In the alternative of FIG. 13, a lever arm 154 is pivotally secured to outer cylinder 132a at pivot 156. An inner cylinder lifting arm 158 is pivotally secured to inner cylinder 142a at inner cylinder attach point 160, which arm 158 in turn is pivotally attached at its opposite end to lever arm 154 at medial pivot 162. As lever arm 154 is lifted to raise inner cylinder 142a, the fulcrum provided by medial pivot 162 will allow inner cylinder 142a to be raised against any relatively high compressive force of spring 138a. inner cylinder attach point of inner cylinder lifting arm 158 passes through outer cylinder 132a by means of slots (not shown), essentially identical to slots 152 shown in FIG. 10. It will be seen that the linkage provided by lever arms 154 and 158, and pivots 156, 160 and 162, will also serve to maintain alignment of inner cylinder 142a and thus cutting blade 144a relative to rollers 126a and 128a. The bend 164 provided in lever arm 154 allows lever arm 154 to retract to a position F flush against the side of outer cylinder 132a of tool 120a, when inner cylinder 142a is at its maximum extension.

FIG. 11 discloses a tool 120b similar to tool 120 of FIG. 10, but utilizing a different means of retracting inner cylinder 166 relative to outer cylinder 168. Tool 120b also contains a compressive spring 138b at the upper end 170 of outer cylinder 168, in a manner similar to that of tools 120 and 120a. However, in the case of tool 120b a shaft 172 passes through the closed upper end 170 of outer cylinder 168, through the center of helical spring 138b, and threads into the upper end 174 of inner cylinder 166. Note that the upper end 176 of shaft 172 which passes through the upper end 170 of outer cylinder 168 is not threaded, and is thus free to move axially through the passage within upper end 170 except for the compressive force of spring 138 b biasing it downward into outer cylinder 168.

An adjustment wheel 178 is secured to the upper unthreaded end 176 of shaft 172, which wheel 178 permits shaft 172 to be threaded into or out of the upper end 174 of inner cylinder 166 in order to adjust the compressive force of spring 138b and/or the opening O between cutting blade 144b and rollers 126b and 128b. It will be seen that the unthreaded upper end 176 of rod 172 will permit rod 172, and therefore inner cylinder 166 and cutting blade 144b, to be drawn directly upward against the compressive force of spring 138b to the extent possible. This may permit sufficient coarse adjustment to allow the insertion of relatively small diameter tubing T within the opening O between cutting blade 144b and roller 126b and 128b, without need to adjust tool 120b by means of wheel 178.

Tools 120 and 120a of FIGS. 10 and 13 provided for the alignment of the two coaxial cylinders, and therefore the cutting blade and rollers, by means of a slot 152 and cooperating pin 150 as shown in FIG. 10. However, the embodiment of FIG. 11 makes no such provision. Accordingly, the lower end 180 of outer cylinder 168 is altered in section to a generally square cross section, as shown in FIG. 12. The lower end 182 of inner cylinder 166 is modified in a like manner to closely fit within the lower end 180 of outer cylinder 168. The flat walls 184 of the lower end 180 of outer cylinder 168, in cooperation with the corresponding flat walls 186 of the lower end 182 of inner cylinder 16, ensure that alignment between inner and outer cylinders 166 and 188, and therefore between cutting blade 144b and rollers 126b and 128b, will be maintained in the embodiment of FIG. 11.

The foregoing will be seen to provide a description of various improvements in the art of cutting tools for tubing, light pipe and the like, having in common an open jaw and a compressive spring biasing the cutting blade toward the rollers and thus eliminating the need for the operator to continually adjust the tool as the cut is deepened in the material being cut.

It is to be understood that the present invention is not limited to the embodiments described above, but encompasses any and all embodiments within the scope of the following claims.

I claim:

1. A hand operated tool for use in cutting tubing and other cylindrical materials, said tool comprising:

a clamp portion having spaced apart first and second jaws extending therefrom and handles extending opposite said first and second jaws;

said first jaw including a cutting jaw having a cutting blade and said second jaw including a roller jaw having a forward and a rear roller with said cutting jaw and said roller jaw comprising a cutting portion;

roller bearing means providing relative movement between said clamp portion and said cutting portion;

said clamp portion including centrally located pivot means and providing a lateral opening between said cutting jaw and said roller jaw opposite said pivot means;

said clamp portion further including a spring urging said first jaw and said second jaw together, whereby said handles are urged together to space apart said roller jaw and said cutting jaw, said cylindrical material is inserted between said spaced apart roller jaw and cutting jaw, said handles are released to allow said spring to urge said rollers and said cutting blade against said cylindrical material, and said tool is rotated about said cylindrical material to provide a circumferential cut by means of said cutting blade as said cutting blade is continually biased against said cylindrical material by means of said spring.

2. The tool of claim 1 wherein:

said roller bearing means providing relative movement between said clamp portion and said cutting portion is positioned between said first jaw and said cutting portion, with said cutting portion having a retaining spring securing said cutting portion to said first jaw.

3. The tool of claim 1 wherein:

said roller bearing means providing relative movement between said clamp portion and said cutting portion is positioned between said second jaw and said roller portion, with said roller portion having a retaining spring securing said roller portion to said second jaw.

4. The tool of claim 1 wherein;

said cutting portion includes linear track means and cooperating linear channel means, whereby said cutting blade maintains a linear alignment relative to said cylindrical support rollers.

5. The tool of claim 1 wherein;

said cutting portion includes arcuate track means and cooperating arcuate channel means, said arcuate track and channel means defined by an arc swung from said pivot, whereby said cutting blade maintains an arcuate alignment relative to said cylindrical support rollers.

6. A hand operated tool for use in cutting tubing and other cylindrical materials, said tool comprising:

a clamp portion having spaced apart first and second jaws extending therefrom and handles extending opposite said first and second jaws;

said first jaw including a cutting jaw having a cutting blade and said second jaw including a roller jaw having a forward and a rear roller with said cutting jaw and said roller jaw comprising a cutting portion;

said second jaw further including a jaw channel providing means for movement of said forward roller and said rear roller within said roller jaw, said clamp portion including centrally located pivot means and providing a lateral opening between said cutting jaw and said roller jaw opposite said pivot means;

said clamp portion further including a spring urging said first jaw and said second jaw together, whereby said handles are urged together to space apart said roller jaw and said cutting jaw, said cylindrical material is inserted between said spaced apart roller jaw and cutting jaw, said handles are released to allow said spring to urge said rollers and said cutting blade against said cylindrical material, and said tool is rotated about said cylindrical material to provide a circumferential cut by means of said cutting blade as said cutting blade is continually biased against said cylindrical material by means of said spring.

7. The tool of claim 6 wherein:

said jaw channel includes a roller channel with said roller channel including said forward roller and said rear roller;

said roller channel being pivotally secured within said roller jaw, whereby said forward roller and said rear roller are each provided with variable spacing relative to said cutting blade by means of said pivotally secured roller channel.

8. The tool of claim 7 wherein:

said jaw channel includes channel axis slots with said roller channel pivotally secured therein; whereby said forward roller and said rear roller are each provided with variable spacing and positioning relative to said cutting blade by means of said pivotally secured roller channel and said jaw channel axis slots.

9. The tool of claim 6 wherein:

said jaw channel includes forward and rear slots;

said forward and rear slots respectively providing positioning for axles for said forward roller and said rear roller and establishing a variable space therebetween; and oppositely threaded spatial adjustment means comprising a turnbuckle rod extending between said forward and rear roller axles, whereby said adjustment means is rotated to threadedly adjust said variable space between said forward roller and said rear roller.

* * * * *